(12) United States Patent
Bussmann et al.

(10) Patent No.: US 6,638,429 B1
(45) Date of Patent: Oct. 28, 2003

(54) METHOD FOR PROCESSING A WATERY SUBSTANCE WITH ZEOLITES

(75) Inventors: Paulus Josephus Theodorus Bussmann, NM Apeldoorn (NL); Jacob Boot, AC Ede (NL)

(73) Assignee: Nederlandse Organisatie voor toegepast-natuurwetenschappelijk Onderzoek TNO (NL)

( * ) Notice: Subject to any disclaimer, the term of this patent is extended or adjusted under 35 U.S.C. 154(b) by 0 days.

(21) Appl. No.: 09/720,563

(22) PCT Filed: Jul. 12, 1999

(86) PCT No.: PCT/NL99/00443
§ 371 (c)(1),
(2), (4) Date: Mar. 16, 2001

(87) PCT Pub. No.: WO00/02822
PCT Pub. Date: Jan. 20, 2000

(30) Foreign Application Priority Data

Jul. 10, 1998 (NL) .............................................. 1009619

(51) Int. Cl.$^7$ ................................................ C02F 1/28
(52) U.S. Cl. ...................... 210/669; 210/670; 210/689; 210/771
(58) Field of Search ................................ 210/670, 689, 210/770, 771, 179, 194, 219, 251, 269, 669

(56) References Cited

U.S. PATENT DOCUMENTS

| | | | | |
|---|---|---|---|---|
| 4,248,164 A | | 2/1981 | Isheim | 110/225 |
| 4,330,411 A | * | 5/1982 | Florin et al. | 210/771 |
| 4,460,476 A | * | 7/1984 | McCaffrey et al. | 210/689 |
| 5,309,849 A | * | 5/1994 | Krebs | 110/224 |
| 5,433,844 A | * | 7/1995 | Christy | 210/219 |
| 6,133,224 A | * | 10/2000 | Angell et al. | 510/444 |

FOREIGN PATENT DOCUMENTS

| | | |
|---|---|---|
| EP | 0 680 936 A1 | 11/1995 |
| FR | 2 658 807 | 8/1991 |
| JP | 55-13134 | 1/1980 |

OTHER PUBLICATIONS

Patent Abstracts of Japan, vol. 004, No. 038 (C–004). Mar. 27, 1980. Publication No. 55013134.
Patent Abstracts of Japan, vol. 006, No. 049 (C–096). Mar. 31, 1982. Publication No. 56161900.
Patent Abstracts of Japan, vol. 012, No. 075 (C–480). Mar. 9, 1988. Publication No. 62213900.

* cited by examiner

*Primary Examiner*—Ivars Cintins
(74) *Attorney, Agent, or Firm*—Muserlian, Lucas and Mercanti, LLP

(57) ABSTRACT

Method and apparatus for processing a watery substance, such as sludge or manure, wherein in a mixer-drier (33) the watery substance to be processed, which may or may not be mechanically partly dewatered (in 31) and/or preheated (in 32), is mixed with zeolites of type A, which adsorb water from the watery substance while releasing adsorption heat which causes an amount of moisture to evaporate, while from the mixer-drier vapor and a mixture of zeolites and dried matter are discharged, whereafter the zeolites are regenerated in an oven (35) through heating, and are returned to the mixer-drier after being separated from dry matter residue formed by the heating, such as ash, and released moisture. Prior to the supply to the oven, at least a part of the dried matter can be extracted by a separation device (34) the mixture formed in the mixer-drier.

13 Claims, 1 Drawing Sheet

METHOD FOR PROCESSING A WATERY SUBSTANCE WITH ZEOLITES

Figure 1:
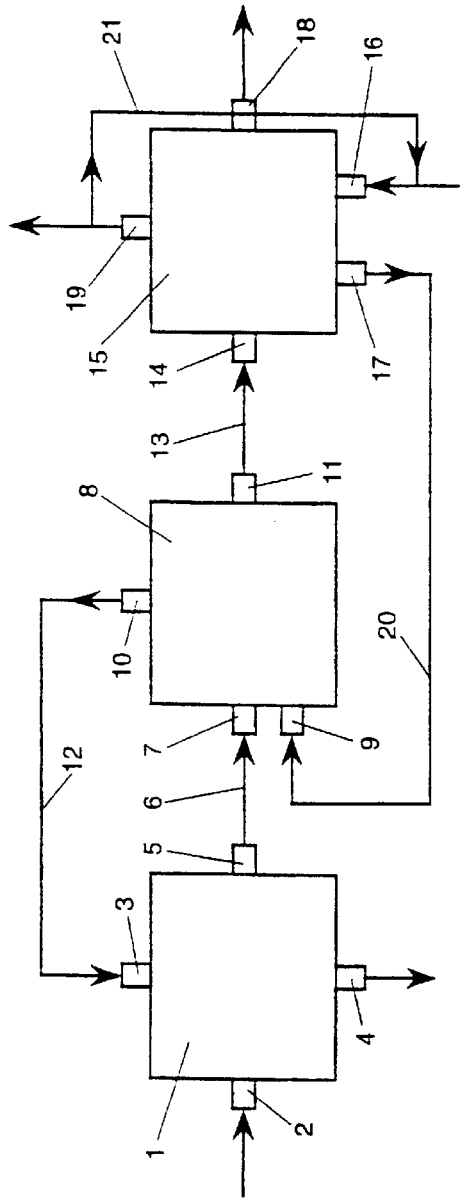

This invention relates to a method for processing a watery substance, such as sludge or manure, wherein the watery substance is mixed with zeolites, the mixture of zeolites and watery substance is dried, the dried matter formed by the extraction of moisture from the watery substance is separated from the zeolites, and the zeolites are reused, as well as to an apparatus for carrying out such a method.

Such a method is known from Japanese patent application 55 013134, wherein such an amount of zeolites in granular form is added that the watery substance covers the surfaces of the granular zeolites thus functioning as carrier material, whereafter the drying of the sludge is accomplished by supplying hot air (hot air blast). From the so obtained mixture of zeolites and dried matter, the dried matter is separated, whereafter the zeolites can be used again. In such a direct drying method, intensive contact and hence a fast heat transmission occurs, but the off-gas processing can give rise to considerable problems and costs.

The object of the invention is for the processing of a watery substance, such as sludge or manure, to be carried out such that the amounts of off-gases are considerably reduced.

In accordance with the invention, this is achieved if in a mixer-drier the watery substance to be processed is mixed with zeolites of type A, which adsorb water from the watery substance while releasing adsorption heat which causes a further amount of moisture to evaporate from the watery substance, and the zeolites, after the separation of the dried matter, are regenerated through heating before being recycled to the mixer-drier for reuse. Through these measures, in the mixer-drier, the watery substance to be processed is brought into a direct intensive contact with the zeolites of type A, which, through their water selectivity, extract water from the watery substance through adsorption, by which mechanism adsorption heat is released which causes the temperature to rise, as a result of which, through evaporation of moisture, a further drying occurs. Discharging the evaporated moisture from the mixer-drier hardly, if at all, leads to off-gas problems. The amount to be added of zeolites of type A (NaA, KA, CaA), also referred to by the three-letter code LTA (Lindé Type A), is dependent on factors such as the desired solids content and the desired temperature of the mixture.

The substance thus dried to the desired value is subjected together with the zeolites to a heating, so that any residual moisture is removed and the zeolites are regenerated, i.e., by the supply of heat the previously adsorbed moisture is separated from the zeolites, and is subsequently discharged in vapor form, which entails few, if any, off-gas problems. The mixture left upon heating, of regenerated zeolites and dried matter residue can subsequently be separated, i.e., the zeolites can be recovered and can be recycled to the mixer-drier again for reuse. The separation can take place, for instance, by means of a screen, it being often preferred, in particular in the case of a fine powdered dried matter residue, that zeolites in a granulate form or a similar granular form are utilized. If, for instance, the dried matter residue to be obtained is a fibrous material, also zeolites in powder form can be of advantage.

With the method according to the invention, due to the water adsorbing action of the zeolites, not only the off-gas problem is reduced but so is the energy consumption. More particularly, with the method according to the invention, the following advantages are obtained:

minimum off-gas amounts and hence minimal costs for off-gas treatment;

high thermal efficiency owing to small gas flows to be heated;

short treatment time due to direct, intensive contact, and compact equipment;

no problems of caking onto the walls of the equipment;

no reflux of dry matter to the mixer-drier is needed;

high solids content at relatively low temperature;

fire-safe due to drying in an inert granule bed.

In a number of cases, for instance in the processing of manure, the dried substance may have commercial value. In those cases, in accordance with a further elaboration of the invention, it may be preferred that a part of the dried matter formed in the mixer-drier is extracted from the mixture of zeolites and dried matter before the mixture is heated for regenerating the zeolites.

Further, in the method according to the invention, advantageously, use can be made of the calorific value of the dried matter. If combustion air is supplied to the oven for at least partly combusting the dried matter in the mixture of zeolites and dried matter, then, depending on the organic fraction to be combusted in the dried matter, even an autothermic process can be obtained, so that the thermal efficiency of the process can be increased in that the supply of external heat can be dispensed with.

A further increase of the thermal efficiency can be obtained if the watery substance to be processed is first mechanically partly dewatered and/or preheated. This last can be done in a further advantageous manner in a pre-drier with vapor discharged from the mixer-drier, while condensate thereby formed is extracted from the mixer-drier.

The invention further relates to an apparatus for carrying out a method as contemplated in the foregoing. According to the invention, such an apparatus is characterized in that it comprises a mixer-drier with mixing means, a supply for watery substance to be processed, such as sludge or manure, a supply for zeolites, a discharge for vapor, and a discharge for a mixture, obtained by the mixing means, of zeolites and dried matter obtained by moisture extraction from the watery substance, to which last discharge transport means are connected which lead to a supply of an oven having, further, a discharge for vapor and discharge means for zeolites and dried matter residue, while separation means are present whence zeolites can be transported back to the mixer-drier.

To be able to separate substances that are of commercial value from the mixture before it is supplied to the oven, it may be provided that the transport means leading from the mixer-drier to the oven include a separation device capable of extracting at least a part of the dried matter from a mixture of zeolites and dried matter coming from the mixer-drier.

The thermal efficiency of the apparatus can be improved if the mixer-drier is preceded by a pre-drier having a supply for sludge to be processed, a supply for vapor coming from the mixer-drier, a discharge for condensate, and a discharge for pre-heated sludge.

For similar reasons, it may further be preferred that the oven comprises a supply for combustion air and a discharge for gases, while means are present for preheating the combustion air to be supplied, with the discharged gases. Thus, both the combustion heat of the organic fraction in the dried matter is fully utilized, and a part of the heat of the discharged air is utilized for preheating the combustion air.

Figure 2:
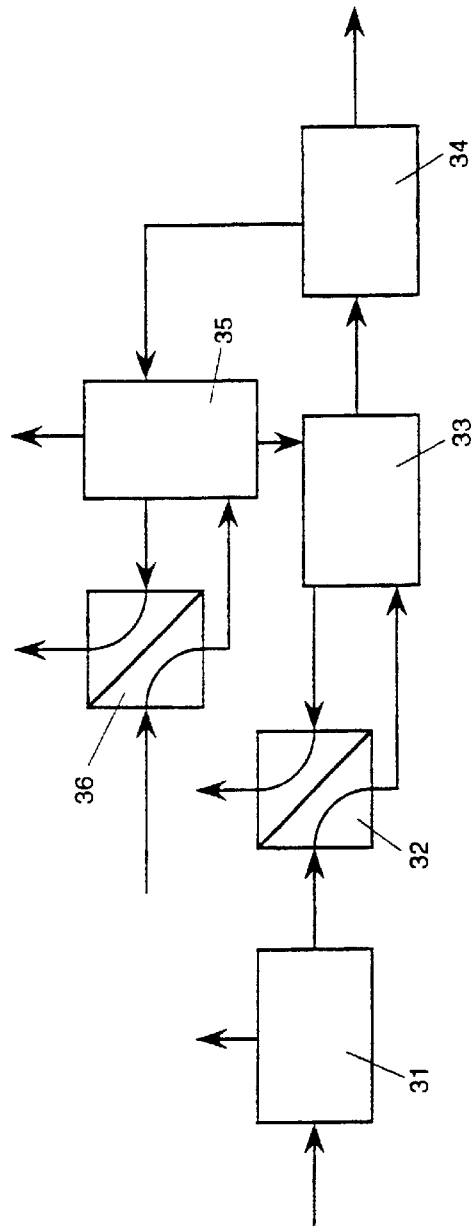

Referring to exemplary embodiments represented in the drawings, the method and apparatus for processing sludge according to the invention will presently be further explained, by way of example only. In the drawings, in block diagram:

FIG. 1 shows a first embodiment of an apparatus according to the invention for processing sludge; and FIG. 2 shows a second embodiment of an apparatus according to the invention for processing manure.

The apparatus according to FIG. 1, which is described, by way of example, for processing sludge, comprises a pre-drier 1 having a sludge supply 2, a vapor supply 3, a condensate discharge 4 and a sludge discharge 5. Suitable sludge transport means 6 connect to the sludge discharge 5 and lead to a sludge supply 7 of a mixer-drier 8, which further comprises a zeolite supply 9, a vapor discharge 10 and a sludge/zeolite discharge 11. Via a line 12, the vapor discharge 10 is connected with the vapor supply 3 of the pre-drier 1. Connected to the sludge/zeolite discharge 11 are transport means 13 which are suitable for transporting a mixture from zeolites and sludge and lead to a sludge/zeolite supply 14 of an oven 15, which further comprises an air supply 16, a zeolite discharge 17, a dried matter discharge 18 and a vapor discharge 19. Via suitable transport means 20, the zeolite discharge 17 is connected with the zeolite supply 9 of the mixer-drier 8. Further, from the vapor discharge 19, a line 21 runs to the air supply 16.

The processing of sludge with such an apparatus can be carried out as explained below.

The sludge to be processed, for instance communal purification sludge having a solids content of about 6%, is introduced, for instance at room temperature, via the sludge supply 2 into the pre-drier 1, to which, further, via the vapor supply 3 hot vapor is supplied for preheating the sludge. Condensate may thereby be formed, which will not, or hardly so, mix with the freshly supplied sludge, but can be removed from the pre-drier 1 via the condensate discharge 4.

The preheated sludge is carried via the sludge discharge 5, the sludge transport means 6 and the sludge supply 7 into the mixer-drier 8, where the sludge is mixed by mixing means with zeolites coming from the zeolite supply 9. Mixing can be done in any suitable known manner. As a result of being mixed with the sludge, the zeolites adsorb water, which, through the release of adsorption heat by the zeolites, involves a vehement heat development, whereby vapor is released which is extracted from the mixer-drier 8 via the vapor discharge 10, and is led into the pre-drier 1 via the line 12 and the vapor supply 3 for the above-mentioned purpose of preheating the sludge.

In the mixer-drier 8, therefore, water is extracted from the mixture both via adsorption by the zeolites and through removal in vapor form. It holds for the above-mentioned sludge that from a mixing ratio of 1:2.5 a visually dry mixture is obtained. Depending on the desired solids content and the mixing temperature, the mixing ratio can be varied. Via the sludge/zeolite discharge 11, the transport means 13 and the sludge/zeolite supply 14, this mixture is carried into the oven 15.

In the oven 15, through the supply of heat, any water left behind in the sludge is evaporated, and the zeolites are regenerated. This last occurs in that water which had been adsorbed by the zeolites in the mixer-drier 8 is removed from the zeolites by heating. In laboratory experiments, a temperature of about 300° C. was found to be sufficient to regenerate the zeolites completely.

The sludge may contain an organic fraction, and then it may be desirable to combust and/or gasify at least a part of that organic fraction. To accomplish this, via the air supply 16, an amount of air that is dependent on the desired effect can be supplied, which air, if desired, is preheated via the line 21 with vapor coming from the vapor discharge 19.

Thus, in the oven, all of the water is removed from the zeolite/sludge mixture coming from the mixer-drier 8, what is left of the sludge being only dry matter and ash. In the oven 15, these last substances can be separated from the zeolites in a simple manner, for instance by means of a grate or screen, so that a separate discharge can take place, whereby the regenerated zeolites can be supplied for reuse to the mixer-drier 8 via the zeolite discharge 17, the transport means 20 and the zeolite supply 9.

The apparatus according to FIG. 2, which is described by way of example for processing manure, comprises a mechanical dewatering device 31, a pre-drier 32, a mixer-drier 33, a separation device 34, an oven 35 and an air preheater 36. The arrows in FIG. 2 indicate the various flows of material, liquid, vapor and gas such as they will be discussed in more detail in the following in an explanation of the operation of the apparatus, the mass of the various flows being indicated by way of example only.

The starting point is an amount of manure to be processed of 1,000 kg which contains 100 kg of dry matter and has a temperature of 15° C. The manure is supplied to the mechanical dewatering device 31, where 600 kg of water is extracted from the manure, whereafter 400 kg of manure, which still contains 100 kg of dry matter, is passed on to the pre-drier 33, where the temperature of this mixture is raised to 90° C. From the pre-drier, the heated and partly dewatered manure is supplied to the mixer-drier 33, to which, further, 600 kg of dry granular zeolites are added which are mixed with the manure. As has already been mentioned, this mixing results in the granular zeolites adsorbing water while releasing adsorption heat, which causes a further amount of water to evaporate. In the present exemplary embodiment, the temperature in the mixer-drier rises to 100° C., and 130 kg of moisture are discharged in vapor form. This vapor of 100° C. is led back to the pre-drier 32 for preheating the partly dewatered manure coming from the mechanical dewatering device 31 and is subsequently discharged as condensate.

As a result of the absorption of the water, the mass of granular zeolites has become 750 kg, which, together with a dried manure mixture of 100 kg of dry matter and 20 kg of water, are transported from the mixer-drier 33 to the separation device 34, where from the dried mixture 90 kg (75 kg of dry matter and 15 kg of water) are separated, which can be sold through the appropriate and known commercial channels for that purpose.

What is left after that separation are 750 kg of granular zeolites and 30 kg of manure mixture (25 kg of dry matter and 5 kg of water), which are jointly transported to the oven 35, where, with addition of 300 kg of air, the dry matter is combusted and/or gasified, which causes the temperature to rise to 400° C., whereby the previously adsorbed water is liberated from the granular zeolites, and is discharged in vapor form together with gases produced by the combustion and/or gasification of the dry matter, to the air preheater 36, through which also the air to be supplied to the oven flows, so that this air is preheated. What is further discharged from the oven 35 is ash produced by the combustion of the dry matter, as well as, separately therefrom, 600 kg of regenerated granular zeolites, which are recycled to the mixer-drier 33 for reuse in the manure treatment process.

It will be clear that within the framework of the invention as set forth in the appended claims, many alterations and variants are possible. Thus, in the exemplary embodiments, the separation of the regenerated zeolites and any further substances present occurs in the oven. Obviously, that separation can also be carried out outside the oven. Depending on the desired temperature in the mixer-drier, the regenerated zeolites can, if desired, be cooled before being supplied to the mixer-drier. That same desired temperature in the mixer-drier may also lead to the process being carried out without pre-drier, i.e., the sludge to be processed is supplied directly to the mixer-drier. In addition, a processing apparatus can be expanded with an upstream station where the watery substance to be processed is pretreated, for instance by the addition of additives or in a different way. In the exemplary embodiments, the air for combusting the organic fraction is extracted from or preheated with vapor separated from the oven. Obviously, it is also possible to withdraw combustion air from the oven directly, and to mix it with fresh air or with hotter air coming from the pre-drier, for effecting the combustion process of the organic fraction, which process, if desired, can also be carried out in a different space than in the oven where the zeolites are regenerated. In the exemplary embodiment discussed last, reference is made to granular zeolites, which are understood to include zeolites in all kinds of granular forms, which can easily be separated, for instance with a screen, from dried and combusted substances such as ash residues and the like. Such zeolites will often be preferred. However, in case the substance to be dried is fibrous in nature, fine powdered zeolites could also be considered.

What is claimed is:

1. A method for processing a watery substance containing solids, comprising:
    a) mixing a watery substance containing solids in a mixer-drier with zeolites of type A and forming a visually dry mixture of zeolites of type A and dried matter, said zeolites of type A adsorbing moisture from the watery substance and releasing beat which evaporates moisture from the watery substance,
    b) separating the zeolites from the dried matter;
    c) regenerating the separated zeolites of type A by heating to remove the moisture adsorbed therein; and
    d) recycling the zeolites of type A to the mixer-drier for reuse.

2. A method according to claim 1, wherein a part of the dried matter is extracted from the visually dry mixture produced in step a), prior to said separating step b).

3. A method according to claim 2, wherein combustion air is supplied during beating of the zeolites to at least partially combust and/or de-gasify the dried matter.

4. A method according to claim 1, wherein the watery substance is partially mechanically dewatered.

5. A method according to claim 1, wherein the substance is preheated.

6. A method according to claim 5, wherein the preheating is carried out in a pre-drier, into which is provided vapor from e mixer-drier, and condensate formed thereby is extracted from the pre-drier.

7. A method according to claim 5, wherein the preheating is carried out in a pre-drier, into which is provided vapor from the mixer-drier, and condensate formed thereby is extracted from the pre-drier.

8. A method for processing a watery substance containing solids, comprising:
    a) mixing a watery substance containing solids in a mixer-drier with zeolites of type A and forming a visually dry mixture of zeolites of type A and dried matter, said zeolites of type A absorbing moisture from the watery substance and releasing heat which evaporates moisture from the watery substance,
    b) regenerating the zeolites of type A by heating to remove the moisture adsorbed therein;
    c) separating the zeolites from the dried matter; and
    d) recycling the zeolites of type A to the mixer-drier for reuse.

9. A method according to claim 8, wherein combustion air is supplied during heating of the zeolites to at least partially combust and/or de-gasify the dried matter.

10. A method according to claim 8, wherein the watery substance is partially mechanically dewatered.

11. A method according to claim 8, wherein the watery substance is preheated.

12. A method for processing a watery substance containing sludge or manure, comprising:
    a) mixing a watery substance containing sludge or manure in a mixer-drier with zeolites of type A and forming a visually dry mixture of zeolites of type A and dried matter, said zeolites of type A adsorbing moisture from the watery substance and releasing heat which evaporates moisture from the watery substance,
    b) separating the zeolites from the dried matter;
    c) regenerating the separated zeolites of type A by heating to remove the moisture adsorbed therein; and
    d) recycling the zeolites of type A to the mixer-drier for reuse.

13. A method for processing a watery substance containing sludge or manure, comprising:
    a) mixing a watery substance containing sludge or manure in a mixer-drier with zeolites of type A and forming a visually dry mixture of zeolites of type A and dried matter, said zeolites of type A adsorbing moisture from the watery substance and releasing heat which evaporates moisture from the watery substance,
    b) regenerating the zeolites of type A by heating to remove the moisture adsorbed therein;
    c) separating the zeolites from the dried matter; and
    d) recycling the zeolites of type A to the mixer-drier for reuse.

* * * * *